US012109578B2

(12) United States Patent
Jourdin

(10) Patent No.: US 12,109,578 B2
(45) Date of Patent: Oct. 8, 2024

(54) PUMP ATTACHMENT MEMBER

(71) Applicant: APTAR FRANCE SAS, Le Neubourg (FR)

(72) Inventor: Gilles Jourdin, Combon (FR)

(73) Assignee: APTAR FRANCE SAS, Le Neubourg (FR)

(*) Notice: Subject to any disclaimer, the term of this patent is extended or adjusted under 35 U.S.C. 154(b) by 12 days.

(21) Appl. No.: 18/001,207

(22) PCT Filed: Jun. 9, 2021

(86) PCT No.: PCT/FR2021/051036
§ 371 (c)(1),
(2) Date: Dec. 8, 2022

(87) PCT Pub. No.: WO2021/250354
PCT Pub. Date: Dec. 16, 2021

(65) Prior Publication Data
US 2023/0219108 A1 Jul. 13, 2023

(30) Foreign Application Priority Data
Jun. 12, 2020 (FR) ....................................... 2006157

(51) Int. Cl.
*B05B 11/10* (2023.01)

(52) U.S. Cl.
CPC ........ *B05B 11/1049* (2023.01); *B05B 11/105* (2023.01)

(58) Field of Classification Search
CPC ............. B05B 11/1047; B05B 11/1049; B05B 11/105
See application file for complete search history.

(56) References Cited

U.S. PATENT DOCUMENTS 4,773,553 A * 9/1988 Van Brocklin ..... B05B 11/1049 222/321.2
5,299,703 A * 4/1994 Cater .................. B05B 11/1049 222/321.7
(Continued)

FOREIGN PATENT DOCUMENTS

FR 2 954 293 A1 6/2011
WO 2009/080980 A1 7/2009

OTHER PUBLICATIONS

International Preliminary Report on Patentability dated Dec. 13, 2023 in International Application No. PCT/FR2021/051036.
(Continued)

*Primary Examiner* — Paul R Durand
*Assistant Examiner* — Randall A Gruby
(74) *Attorney, Agent, or Firm* — Sughrue Mion, PLLC

(57) ABSTRACT

A pump attachment member, produced by plastic moulding, having a skirt, an annular plate and a receiving sleeve defining a receiving recess formed by a moulding pin which is forcibly withdrawn on release from the mould, the receiving recess having an inwardly projecting annular inlet rib, the attachment flange of a distribution member being held in the receiving recess by said annular inlet rib. The annular inlet rib having retaining segments for engaging with the attachment flange and mould release segments for engaging with the moulding pin on release from the mould.

14 Claims, 2 Drawing Sheets

(56) References Cited

Figure 1:
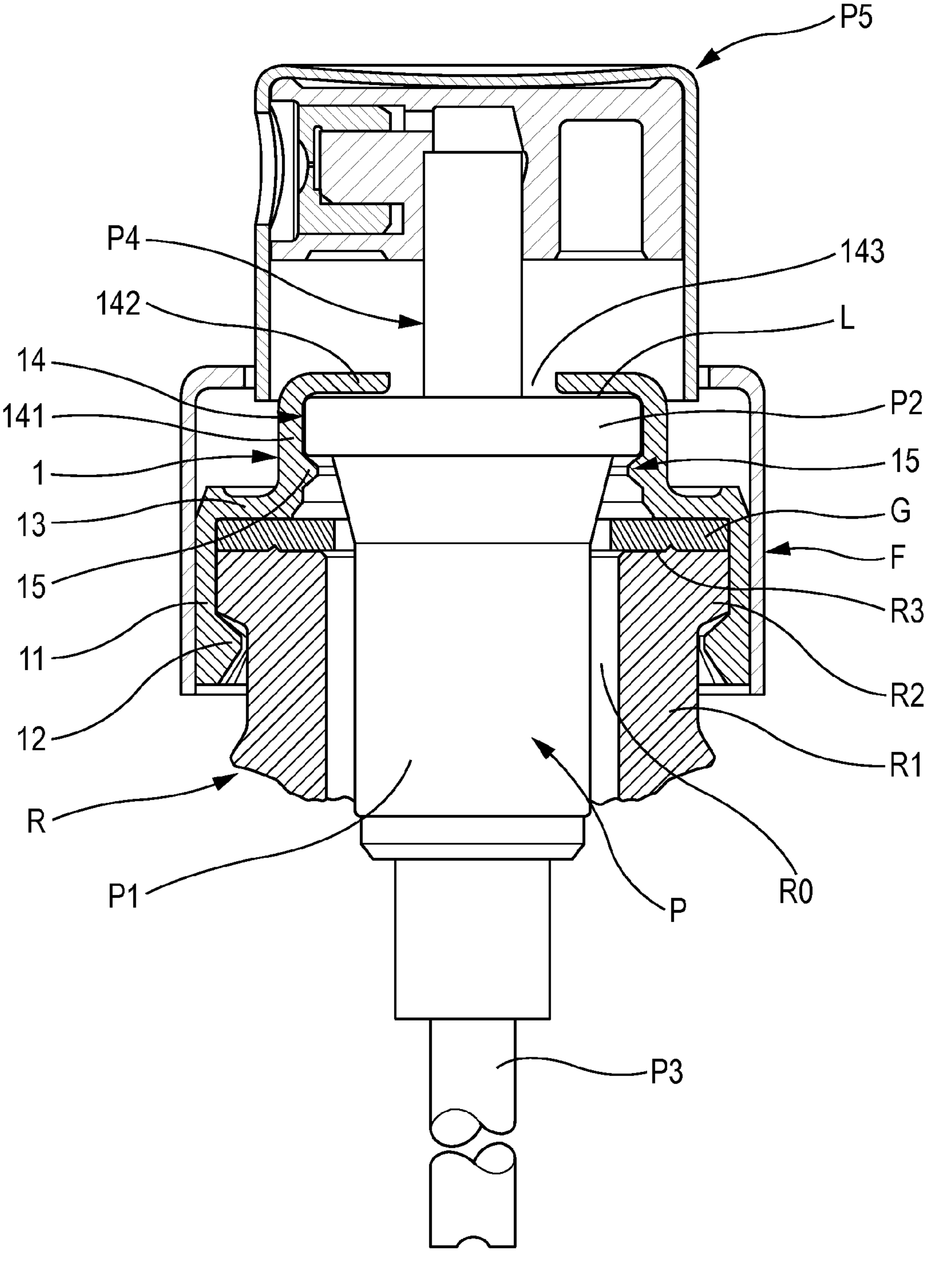

U.S. PATENT DOCUMENTS 5,562,219 A * 10/1996 de Pous ............... B65D 83/205 215/276
6,253,941 B1 * 7/2001 VanBrocklin .......... B65D 83/48 222/321.9
6,273,303 B1 * 8/2001 de Pous ................ B65D 83/38 222/402.1
6,571,991 B2 * 6/2003 Jourdin ............... B05B 11/1049 222/321.9
6,595,395 B2 * 7/2003 Jourdin ................. B65D 83/38 222/321.9
6,672,488 B2 * 1/2004 de Pous .............. B05B 11/1049 222/321.9
6,772,893 B2 * 8/2004 Pares Montaner .......................... B05B 11/1049 215/274
6,799,690 B2 * 10/2004 de Pous .............. B05B 11/1049 215/274
7,780,043 B2 * 8/2010 Jourdin ............... B05B 11/1049 222/321.9
8,191,736 B2 * 6/2012 Beranger ............ B05B 11/1049 215/318
8,292,132 B2 * 10/2012 Behar ................. B05B 11/1049 222/153.1
8,413,853 B2 * 4/2013 Behar ................. B05B 11/1049 222/402.1
8,430,277 B2 * 4/2013 Dumont ............... B65D 83/425 222/402.1
8,544,690 B2 * 10/2013 Garcia ................... B65D 83/38 222/153.09
8,544,691 B2 * 10/2013 Roosel ................ B05B 11/1049 222/153.04
8,550,311 B2 * 10/2013 Cornet ................ B05B 11/1049 222/321.9
8,646,245 B2 * 2/2014 Behar ................... B65B 31/003 53/471
8,820,552 B2 * 9/2014 Pleyer ................. B05B 11/1049 222/153.09
8,857,671 B2 * 10/2014 Muller ................ B05B 11/1052 222/402.1
8,875,946 B2 * 11/2014 Muller .................... B05B 15/00 222/402.1
8,950,631 B2 * 2/2015 Langlois ............. B05B 11/1049 222/402.1
9,132,443 B2 * 9/2015 Brahim ................... F16L 21/08
9,359,116 B2 * 6/2016 Beranger ............ B05B 11/1025
9,469,422 B2 * 10/2016 Lasnier ..................... B65B 3/10
9,757,754 B2 * 9/2017 Burrowes ............. B05B 7/0408
10,953,420 B2 * 3/2021 Barenhoff ........... B05B 11/1074
11,382,398 B2 * 7/2022 Woo ................... B65D 83/0005
11,813,627 B2 * 11/2023 Perignon ................ A45D 34/04
2005/0061834 A1 * 3/2005 Garcia ................... B65D 83/38 222/321.7
2008/0296309 A1 * 12/2008 Jourdin ............... B05B 11/1049 72/340
2009/0045228 A1 * 2/2009 Jourdin ..................... G21F 5/06 222/321.9
2009/0101232 A1 * 4/2009 Michaux ................ B65D 83/38 141/369
2010/0119293 A1 * 5/2010 Zavarella ............ B05B 11/1049 403/2
2010/0264171 A1 * 10/2010 Behar .................... B65D 83/38 222/402.1
2012/0061423 A1 * 3/2012 Muller ................ B05B 11/1052 222/321.9
2012/0285991 A1 * 11/2012 Muller .................... B05B 15/00 222/113
2018/0093286 A1 * 4/2018 Jourdin ............... B05B 11/1094

OTHER PUBLICATIONS

International Search Report for PCT/FR2021/051036 dated Oct. 15, 2021.
French Search Report for PCT/FR2021/051036 dated Oct. 15, 2021.

* cited by examiner

PUMP ATTACHMENT MEMBER

CROSS REFERENCE TO RELATED APPLICATIONS

This application is a National Stage of International Application No. PCT/FR2021/051036 filed Jun. 9, 2021, claiming priority based on French Patent Application No. 2006157 filed Jun. 12, 2020.

The present invention relates to an attachment member or ring for mounting a distribution member on a neck of a reservoir. This type of attachment ring is used in the fields of perfumery, cosmetics or pharmacy to definitively or removably mount distribution members, such as pumps, valves, stoppers, etc., on a fluid product, granulate or powder reservoir.

In the prior art, it is known to produce the attachment member by plastic moulding. The attachment member generally defines a vertical axis of symmetry and comprises a skirt engaged with (in or around) the neck, an annular plate resting axially on the neck, with an optional seal flattened therebetween, and a receiving sleeve in which the attachment flange of the distribution member is fixedly received. This receiving sleeve defines a receiving recess which is formed by a moulding pin which is forcibly withdrawn on release from the mould. This receiving recess comprises an inwardly projecting annular inlet rib and which thus reduces the opening of the receiving recess. The attachment flange of the body of the distribution member is held in the receiving recess by this annular inlet rib. Generally, the annular inlet rib is presented in the form of a continuous annular bead with a constant cross-section.

It is easily understood that, on release from the mould, the moulding pin which forms the receiving recess exerts a significant stress on the annular inlet rib. The moulding pin, made of metal, therefore deforms the rib. The aim is that this deformation is temporary and elastic, and not definitive. The rib must not be grated, scraped, curled, or also laminated by the pin. It must be ensured that the rib remains as intact as possible. Often, the rib is slightly damaged. In order to confer a high elastic deformability to the rib on release from the mould, it is common to form it at a cylindrical wall which enables a reversible dilatation.

However, in certain cases, a greater holding of the flange in the receiving recess is required. But, the radial projection of the rib cannot be increased, as unpinning is no longer possible without damaging it. The cylindrical wall where the rib is formed also has elastic deformation limits.

In other cases, the rib must be placed lower, for example at the annular plate, which only offers a very limited elastic deformation capacity. The unpinning thus very often leads to the annular rib being damaged.

The aim of the present invention is to preserve, as much as possible, the integrity of the annular inlet rib on release from the mould. In other words, the rib must remain in its initial moulding state after the withdrawal of the moulding pin. Another aim is to not complicate the moulding and mould release operation, nor imposing a particular plastic material.

To do this, the present invention proposes that the annular inlet rib comprise retaining segments for engaging with the attachment flange and mould release segments for engaging with the moulding pin during the release from the mould. Thus, only the mould release segments are constrained by the mould release pin and the retaining segments remain non-urged by the pin and are therefore intact. It does not really matter if the mould release segments are damaged on release from the mould, since they do not contribute to the holding of the flange. The mould release segments act as protective members or shields for the retaining segments, by being placed in the first line in the unpinning path of the pin. It can also be said that the conventional projecting bead has been segmented and that one part of the protrusion will fulfil its function of holding the flange in the recess, while the other part of the protrusion has been dedicated to mould release or unpinning to preserve the part dedicated to holding.

Advantageously, the retaining segment and the mould release segments comprise respectively retaining faces and cam faces which are rotated inwards from the receiving recess, the cam faces defining a slope with respect to the vertical axis which is larger than that of the retaining faces. Thus, the largest slope of the mould release segments ensures that the pin, during its withdrawal, will attack the cam faces of the mould release segments and move away from the retaining faces of the retaining segments. Naturally, just after moulding and before release from the mould, the moulding pin is in contact both with the retaining faces and with the cam faces, since it is this which has formed them. However, on release from the mould, the pin will only remain in contact with the cam faces, due to their increased slope: the retaining faces will be moved radially outwards without contact with the pin, but by way of the mould release segments, which are moved radially outwards, even if being deteriorated by the pin at the same time.

As a non-limiting example, the slope of the cam faces with respect to that of retaining faces is greater than 1 to 10 degrees, advantageously from 2 to 6 degrees and preferably around 3 to 5 degrees.

According to a feature of the invention, the retaining segments and the mould release segments can be arranged alternately. They can be jointed or separated by slots. For example, ten retaining segments and ten interposed mould release segments can be provided.

According to another aspect, the retaining segments can project more radially inwards than the mould release segments. In a variant or in addition, the retaining segments can have an axial height greater than that of the mould release segments. The mould release segments can be presented roughly in the form of a retaining mini-segment.

On the other hand, the mould release faces can be offset axially downwards with respect to the retaining faces, such that the annular inlet rib has an upper crenelated configuration.

The present invention has a quite particular advantage when the annular inlet rib is located in the axial proximity of, or substantially at same axial level as the annular plate, such that the elastic deformation capacity on release from the mould is reduced.

The present invention also defines a fluid product distributor comprising a fluid product reservoir, a distribution member, such as a pump or a valve, and an attachment member such as defined above, to mount the distribution member on the fluid product reservoir.

The scope of the invention relates to the action of protecting the retaining zones of the inlet rib of the receiving recess which will come into contact with the attachment flange with cam zones which are in the first line on the unpinning path and which will absorb the impact of the pin, at the risk of being damaged. It is thus guaranteed that the retaining zones emerge intact from unpinning and can fully fulfil their retaining function.

The invention will now be described in more detail, in reference to the accompanying drawings, giving as a non-limiting example, an embodiment of the invention.

Figure 2:
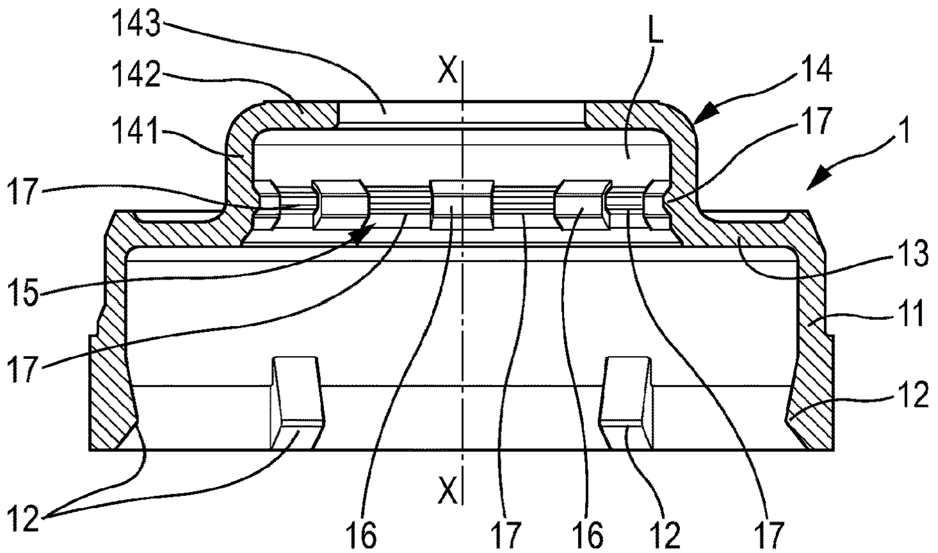
Figure 3:
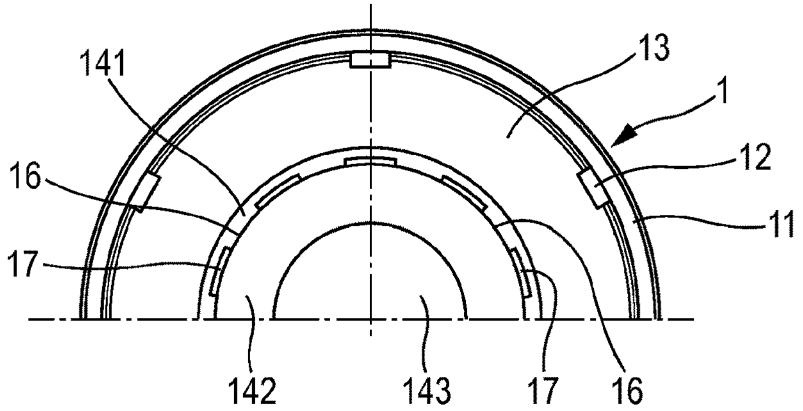
Figure 4A:
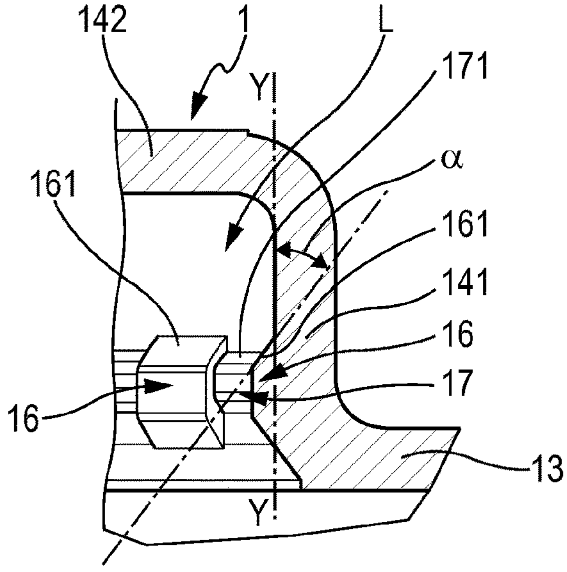
Figure 4B:
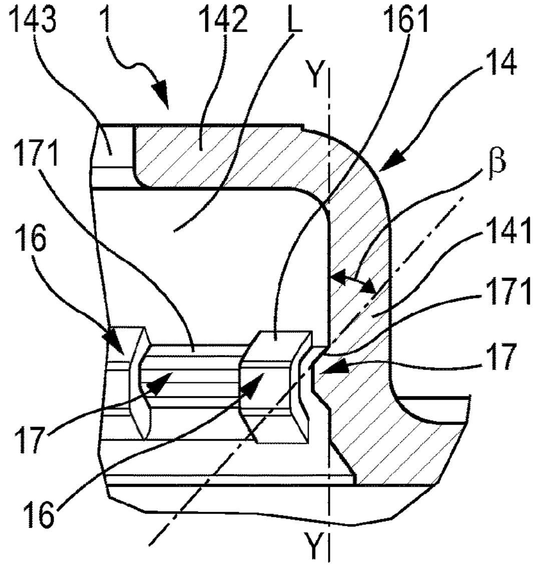

In the figures:

FIG. 1 is a vertical transverse cross-sectional view through a fluid product distributor according to the invention, FIG. 2 is an enlarged vertical transverse cross-section view through an attachment member according to the invention, FIG. 3 is a horizontal transverse cross-sectional view through the attachment member of FIG. 2, FIG. 4*a* is an enlarged cross-sectional view along a cutting plane passing through a retaining segment of the attachment member of FIGS. 2 and 3, and FIG. 4*b* is a view similar to that of FIG. 4*b* along another cutting plane passing through a mould release segment of the attachment member of FIGS. 2 and 3.

The distributor of FIG. 1 comprises a fluid product reservoir R, a distribution member P and an attachment member 1 which forms the subject of the present invention. Optionally, the distributor can also comprise a trim band F which is engaged around the distribution member 1.

The fluid product reservoir R is not critical for the present invention, such that it can be made of any suitable material and have any shape. The reservoir R comprises a neck R1 which projects upwards and defines an opening R0 which makes it possible to access the inside of the reservoir. The neck R1 comprises an annular reinforcement R2 which projects outwards. Thus, this reinforcement R2 defines an annular shoulder oriented downwards. The neck R1 also defines an upper annular edge R3.

The distribution member P can be a pump or a valve. It comprises a body P1 defining an attachment flange P2 and equipped with a dip tube P3. The distribution member P also comprises an actuation rod P4 which has a pushbutton P5. Thus, by pressing the pushbutton P5, the actuation rod P4 sinks inside the body P1, thus pressurising a dose of fluid product in the case of a pump or opening an outlet flap in the case of a valve. There again, the type of distribution member P is not critical for the present invention. It suffices that the body P1 comprises a projecting attachment flange P2.

The attachment member 1 of the invention has an axial symmetry along a vertical axis X and comprises a skirt 11 which engages with the neck R1. In the embodiment used to illustrate the present invention, the skirt 11 comprises attachment teeth 12 which engage below the annular reinforcement R2. The skirt 11 can be continuous, as is the case here, or also split, so as to form flexible tabs separated by slots. The attachment member 1 also comprises an annular plate 13 which extends radially inwards from the upper end of the skirt 11. This annular plate 13 can serve to flatten a neck seal G on the upper annular edge R3 of the neck R1. Due to its annular configuration, the plate 13 has a very reduced radial deformation capacity. The attachment member 1 also comprises a receiving sleeve 14 which extends upwards from the inner periphery of the plate 13. This receiving sleeve 14 comprises a cylindrical part 141 which extends upwards from the inner periphery of the plate 13 and an annular flange 142 which extends radially inwards from the upper end of the cylindrical part 141. In its centre, the annular flange 142 forms a central opening 143 through which the actuation rod P4 of the distribution member P extends. The inner wall of the cylindrical part 141 forms an inwardly projecting annular inlet rib 15. Thus, the receiving sleeve 14 defines a receiving recess L, the inlet of which is reduced by the projection of the annular inlet rib 15. It can be seen in FIG. 1 that the annular attachment flange P2 of the distribution member P is housed inside this receiving recess L, surrounded by the cylindrical part 141 and sandwiched between the annular inlet rib 15 and the annular flange 142. The distribution member P is thus held fully stable, even sealed, inside the receiving sleeve 14. This is an absolutely conventional configuration for an attachment member in the field of perfumery, cosmetics or also pharmacy.

The present invention relates to the annular inlet rib 15 which will now be described in detail in reference to FIGS. 2, 3, 4*a* and 4*b*.

It can immediately be noted from FIG. 2, that the annular inlet rib 15 is not constant or regular over its periphery. On the contrary, this annular rib 15 defines an alternance of retaining segments 16 and mould release segments 17 having different configurations. Each retaining segment 16 is bordered by two adjacent mould release segments 17, and vice versa. The segments 16 and 17 can be joined, or on the contrary, separated by slots. It can also be noted that the retaining segments 16 have an axial height or extent greater than that of the mould release segments 17. In FIG. 3, it can also be noted that the retaining segments 16 have a radial thickness greater than that of the mould release segments 17. In summary, the retaining segments 16 are higher and/or more projecting than the mould release segments 17.

By referring to FIGS. 4*a* and 4*b*, it can be noted that the retaining segments 16 each comprise a retaining face 161 which is inclined upwards and inwards from the receiving recess L. It can be said that this retaining face 161 forms the first abutment of the retaining segment 16 inside the receiving recess L. It is understood that this retaining face 161 will engage with the lower edge of the annular flange P2 of the distribution member P, if FIG. 1 is referred to again.

It can also be noted that the mould release segments 16 each form a cam face 171 which is oriented upwards and inwards from the receiving recess L. The cam faces 171 are not located at the same axial level as the retaining faces 161: indeed, it can be seen that the cam faces 171 are disposed slightly lower than the retaining faces 161, so as to confer a crenelated shape to the annular rib 15.

FIG. 4*a* is a cross-sectional view through a retaining rib 16. Its retaining face 161 extends with a slope which forms an angle $\alpha$ with respect to the vertical Y. FIG. 4*b* is a cross-sectional view through a mould release rib 17. Its cam face 171 has a slope forming an angle $\beta$ with respect to the vertical Y. According to the invention, the angle $\beta$ is greater than the angle $\alpha$. As an example, the angle $\alpha$ can be 38.5°, while the angle $\beta$ can be 42°. These values are given purely as for information. Indeed, the difference between the angles $\alpha$ and $\beta$, always in favour of the angle $\beta$, can vary from 1 to 10°, advantageously from 2 to 6°, preferably between 3 and 5°.

The attachment member 1 is conventionally produced by plastic injection/moulding. A moulding pin (not represented) defines an outer imprint corresponding to the inner walls of the attachment member 1. The moulding pin therefore comprises a moulding head which forms the inside of the receiving recess L. The head of the moulding pin therefore comprises raised and hollow profiles which negatively correspond to the retaining segments 16 and to the mould release segments 17. After injection of plastic around the moulding pin, this moulding pin must be withdrawn from the inside of the attachment member 1. However, the annular inlet rib 15 extends radially inwards, such that the moulding pin must be forcibly withdrawn by deforming the receiving sleeve 14, and more specifically, its cylindrical wall 141.

This is absolutely conventional in the moulding of attachment members in the field of perfumery, cosmetics or also pharmacy.

According to the invention, the head of the moulding pin will first engage with the mould release segments 17 and leave the retaining segments stress-free. Thus, the mould release segments 17 will optionally or probably be damaged or deteriorated by the moulding pin, but the retaining segments 17 will remain intact and can fulfil their retaining function of the annular flange P2. Indeed, given that the cam face 171 of the mould release segments 17 has a higher or greater slope than that of the retaining faces 161, the mould release pin will engage pressed against the cam faces 171 and extend from the retaining faces 161, thus leaving them intact.

The mould release segments 17 of the invention make it possible to produce attachment members with a greater holding or an annular rib disposed in the proximity of the annular plate 13, which reduces the radial deformation. Indeed, it does not matter that the mould release segments 17 are damaged, insofar as the retaining segments 16 remain intact or practically intact. In order to guarantee the integrity of the retaining segments 16, it is preferable that the mould release segments are located in the direct proximity of the retaining segments, and are of a sufficient number. In the example used to illustrate the present invention, there are ten retaining segments and ten mould release segments. The retaining and mould release segments can extend angularly over identical or similar extents.

Thanks to the invention, an attachment member is available, the annular rib 15 of the receiving recess L of which fully fulfils its function, given that the retaining segments 16 are preserved by the mould release segments 17.

The invention claimed is:

1. An attachment member for mounting a distribution member on a neck of a fluid product reservoir, the distribution member comprising a body forming an attachment flange, the attachment member being produced by plastic moulding in a mould, the attachment member defining a vertical axis and comprising:

a skirt engaged with the neck, an annular plate resting axially on the neck, a receiving sleeve in which the attachment flange of the distribution member is fixedly received, this receiving sleeve defining a receiving recess formed by a moulding pin which is forcibly withdrawn on release from the mould, the receiving recess comprising an inwardly projecting annular inlet rib and which thus reduces the opening of the receiving recess, the attachment flange being held in the receiving recess by this annular inlet rib, wherein the annular inlet rib comprises retaining segments for engaging with the attachment flange and mould release segments for engaging with the moulding pin on release from the mould; and wherein the retaining segments and the mould release segments comprise, respectively, retaining faces and cam faces that are rotated inwards from the receiving recess, the cam faces defining a slope with respect to the vertical axis which is greater than that of the retaining faces.

2. The attachment member according to claim 1, wherein the slope of the cam faces with respect to that of the retaining faces is greater by 1 to 10 degrees.

3. The attachment member according to claim 1, wherein the retaining segments and the mould release segments are arranged alternately.

4. The attachment member according to claim 1, wherein the retaining segments project more radially inwards than the mould release segments.

5. The attachment member according to claim 1, wherein the retaining segments have an axial height greater than that of the mould release segments.

6. The attachment member according to claim 1, wherein the retaining segments and the mould release segments are joined.

7. The attachment member according to claim 1, wherein mould release faces are offset axially downwards with respect to the retaining faces, such that the annular inlet rib has an upper crenelated configuration.

8. The attachment member according to claim 1, wherein the annular inlet rib is located in axial proximity or at the same axial level as the annular plate.

9. A fluid product distributor comprising a fluid product reservoir, a distribution member and an attachment member according to claim 1, to mount the distribution member on the fluid product reservoir.

10. The attachment member according to claim 1, further comprising a seal flattened between the annular plate and the neck.

11. The attachment member according to claim 1, wherein the distribution member is a pump or a valve.

12. The attachment member according to claim 1, wherein the slope of the cam faces with respect to that of the retaining faces is greater by 2 to 6 degrees.

13. The attachment member according to claim 1, wherein the slope of the cam faces with respect to that of the retaining faces is around 3 to 5 degrees.

14. The fluid product distributor according to claim 9, wherein the distribution member is a pump or a valve.

* * * * *